US012748966B2

(12) United States Patent
Ando

(10) Patent No.: US 12,748,966 B2
(45) Date of Patent: Sep. 29, 2026

(54) LEARNING DATA GENERATING SYSTEM AND LEARNING DATA GENERATING METHOD

(71) Applicant: OLYMPUS CORPORATION, Tokyo (JP)

(72) Inventor: Jun Ando, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 1063 days.

(21) Appl. No.: 17/902,009

(22) Filed: Sep. 2, 2022

(65) Prior Publication Data

US 2023/0011053 A1 Jan. 12, 2023

Related U.S. Application Data

(63) Continuation of application No. PCT/JP2020/009215, filed on Mar. 4, 2020.

(51) Int. Cl.
*G06N 3/08* (2023.01)
*G06N 3/045* (2023.01)
(Continued)

(52) U.S. Cl.
CPC ............... *G06N 3/08* (2013.01); *G06N 3/045* (2023.01); *G06N 3/09* (2023.01); *G06T 7/00* (2013.01); *G06N 3/0464* (2023.01)

(58) Field of Classification Search
CPC ............ G06N 3/08; G06N 3/045; G06N 3/09; G06N 3/0464; G06T 7/00
See application file for complete search history.

(56) References Cited

U.S. PATENT DOCUMENTS

2012/0213432 A1* 8/2012 Wang ........................ G06T 7/12 382/164
2019/0378271 A1 12/2019 Takeshima
(Continued)

FOREIGN PATENT DOCUMENTS

JP 2019213623 A 12/2019
JP 2020017229 A 1/2020

OTHER PUBLICATIONS

Kim, D., Jang, H. U., Mun, S. M., Choi, S., & Lee, H. K. (2017). Median filtered image restoration and anti-forensics using adversarial networks. IEEE Signal Processing Letters, 25(2), 278-282. (Year: 2017).*

(Continued)

*Primary Examiner* — James T Tsai
(74) *Attorney, Agent, or Firm* — Scully, Scott, Murphy & Presser, P.C.

(57) ABSTRACT

A learning data generating system includes a processor. The processor inputs a first image to a first neural network to generate a first feature map by the first neural network and inputs a second image to the first neural network to generate a second feature map by the first neural network. The processor generates a combined feature map by replacing a part of the first feature map with a part of the second feature map. The processor inputs the combined feature map to a second neural network to generate output information by the second neural network. The processor calculates an output error based on output information, first correct information, and second correct information.

20 Claims, 14 Drawing Sheets

(51) Int. Cl.

| | |
|---|---|
| ***G06N 3/0464*** | (2023.01) |
| ***G06N 3/09*** | (2023.01) |
| ***G06T 7/00*** | (2017.01) |

(56) References Cited

U.S. PATENT DOCUMENTS

| | | | | |
|---|---|---|---|---|
| 2021/0068788 | A1* | 3/2021 | Yang | A61B 8/5207 |
| 2021/0174149 | A1* | 6/2021 | Zhou | G06F 18/214 |
| 2021/0256680 | A1* | 8/2021 | Xie | G06N 3/084 |

OTHER PUBLICATIONS

Moisan, L. (2011). Periodic plus smooth image decomposition. Journal of Mathematical Imaging and Vision, 39(2), 161-179. (Year: 2011).*
Verma, V. et al., "Manifold Mixup: Better Representations By Interpolating Hidden States", 2018, Arxiv: 1806.05236.
International Search Report dated Jun. 9, 2020 received in International Application No. PCT/JP2020/009215.
Lun, Sangdoo, et al., "CutMix: Regularization Strategy to Train Strong Classifiers with Localizable Features", Aug. 7, 2019 IEEE/CVF International Conference on Computer.
Chinese Office Action dated May 1, 2025 received in 202080097998.

* cited by examiner

LEARNING DATA GENERATING SYSTEM AND LEARNING DATA GENERATING METHOD

CROSS REFERENCE TO RELATED APPLICATION

This application is a continuation of International Patent Application No. PCT/JP2020/009215, having an international filing date of Mar. 4, 2020, which designated the United States, the entirety of which is incorporated herein by reference.

BACKGROUND

Using deep learning to improve accuracy of artificial intelligence (AI) requires a large amount of learning data. For preparing the large amount of learning data, there is known a method of padding learning data out by using original learning data as a basis. As the method of padding the learning data out, Manifold Mixup is disclosed in Vikas Verma, Alex Lamb, Christopher Beckham, Amir Najafi, Ioannis Mitliagkas, Aaron Courville, David Lopez-Paz and Yoshua Bengio: "Manifold Mixup: Better Representations by Interpolating Hidden States", arXiv: 1806.05236 (2018). In this method, two different images are input to a convolutional neural network (CNN) to extract a feature map that is output of an intermediate layer of the CNN, a feature map of the first image and a feature map of the second image are subjected to addition with weighting to combine the feature maps, and the combined feature maps are input to the next intermediate layer. In addition to learning based on two original images, learning of combining the feature maps in the intermediate layer is performed. As a result, learning data is padded out.

SUMMARY

In accordance with one of some aspect, there is provided a learning data generating system comprising a processor, the processor being configured to implement:

acquiring a first image, a second image, first correct information corresponding to the first image, and second correct information corresponding to the second image;

inputting the first image to a first neural network to generate a first feature map by the first neural network and inputting the second image to the first neural network to generate a second feature map by the first neural network;

generating a combined feature map by replacing a part of the first feature map with a part of the second feature map;

inputting the combined feature map to a second neural network to generate output information by the second neural network;

calculating an output error based on the output information, the first correct information, and the second correct information; and updating the first neural network and the second neural network based on the output error.

In accordance with one of some aspect, there is provided a learning data generating method comprising:

acquiring a first image, a second image, first correct information corresponding to the first image, and second correct information corresponding to the second image;

inputting the first image to a first neural network to generate a first feature map and inputting the second image to the first neural network to generate a second feature map;

generating a combined feature map by replacing a part of the first feature map with a part of the second feature map;

generating, by a second neural network, output information based on the combined feature map;

calculating an output error based on the output information, the first correct information, and the second correct information; and updating the first neural network and the second neural network based on the output error.

DESCRIPTION OF EXEMPLARY EMBODIMENTS

Figure 1:
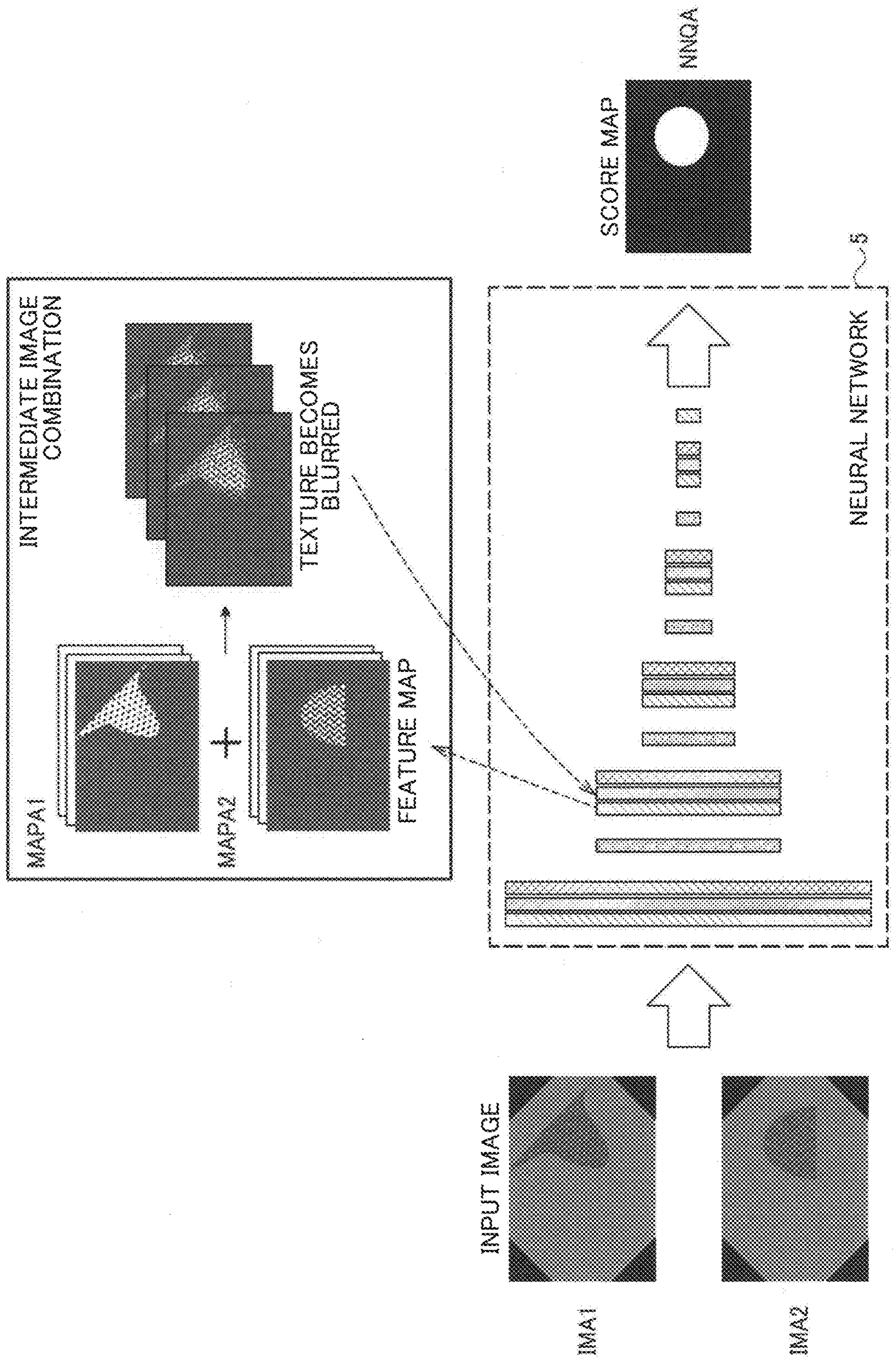
FIG. 1 is an explanatory diagram of Manifold Mixup.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

1. First Configuration Example

In a recognition process using deep learning, a large amount of learning data is required to avoid over-training. However, in some cases, such as a case of medical images, it is difficult to collect a large amount of learning data required for recognition. For example, regarding images of a rare lesion, case histories of the lesion itself are rarely found, and collecting a large amount of data is difficult. Alternatively, although it is necessary to provide training labels to the medical images, providing the training labels to a large number of images is difficult because of requirements of professional knowledge or other reasons.

In order to deal with such a problem, there is proposed data augmentation of augmenting learning data by performing processing such as deformation to existing learning data. Alternatively, there is proposed Mixup in which an image obtained by combining two images that have different labels by a weighted sum is added to training images to thereby focus on learning around a boundary between the labels. Alternatively, as disclosed in the above-mentioned Vikas Verma, Alex Lamb, Christopher Beckham, Amir Najafi, Ioannis Mitliagkas, Aaron Courville, David Lopez-Paz and Yoshua Bengio: “Manifold Mixup: Better Representations by Interpolating Hidden States”, arXiv: 1806.05236 (2018), there is proposed Manifold Mixup of combining two images that have different labels by a weighted sum in an intermediate layer of a CNN. Effectiveness of Mixup and Manifold Mixup is apparent primarily in natural image recognition.

Referring to FIG. 1, a method of Manifold Mixup will be described. A neural network 5 is a convolutional neural network (CNN) that performs image recognition through a convolutional process. In image recognition after learning, the neural network 5 outputs one score map with respect to one input image. On the other hand, during learning, two input images are input to the neural network 5, and feature maps are combined in an intermediate layer to thereby pad learning data out.

Specifically, to an input layer of the neural network 5, input images IMA1 and IMA2 are input. A convolutional layer of the CNN outputs image data called a feature map. From a certain intermediate layer, a feature map MAPA1 corresponding to the input image IMA1 and a feature map MAPA2 corresponding to the input image IMA2 are extracted. MAPA1 is a feature map generated by applying the CNN from the input layer to the certain intermediate layer to the input image IMA1. The feature map MAPA1 has a plurality of channels, each of which constitute one piece of image data. The same applies to MAPA2.

FIG. 1 illustrates an example where the feature map has three channels. The channels are denoted with ch1, ch2, and ch3. The channel ch1 of the feature map MAPA1 and the channel ch1 of the feature map MAPA2 are subjected to addition with weighting to generate a channel ch1 of a combined feature map SMAPA. The channels ch2 and ch3 are similarly subjected to addition with weighting to generate channels ch2 and ch3 of the combined feature map SMAPA. The combined feature map SMAPA is input to an intermediate layer next to the intermediate layer from which the feature maps MAPA1 and MAPA2 are extracted. The neural network 5 outputs a score map as output information NNQA, and the neural network 5 is updated on the basis of the score map and correct information.

In each channel of the feature map, various features are extracted in accordance with a filtering weight coefficient of the convolutional process. In the method of FIG. 1, channels of the feature maps MAPA1 and MAPA2 are subjected to addition with weighting. Therefore, pieces of information on texture of respective feature maps are mixed. Accordingly, there is a risk that a subtle difference in texture is not learned appropriately. For example, there is a risk when, like in lesion discrimination from ultrasonic endoscope images, a subtle difference in texture of lesions is necessary to be recognized, that a sufficient learning effect cannot be obtained.

As described above, in the conventional technology, feature maps of two images are subjected to addition with weighting in an intermediate layer of a CNN, and therefore texture information contained in the feature maps of the respective images is lost. For example, addition with weighting of the feature maps makes a slight difference in texture come to nothing. Accordingly, there is a problem that, when a target is subjected to image recognition on the basis of texture included in the image, learning performed using a padding method of the conventional technology does not sufficiently improve accuracy of recognition. For example, when lesion discrimination is performed from medical images such as ultrasonic images, recognizability of a subtle difference in texture of lesions appearing in the images is important.

Figure 2:
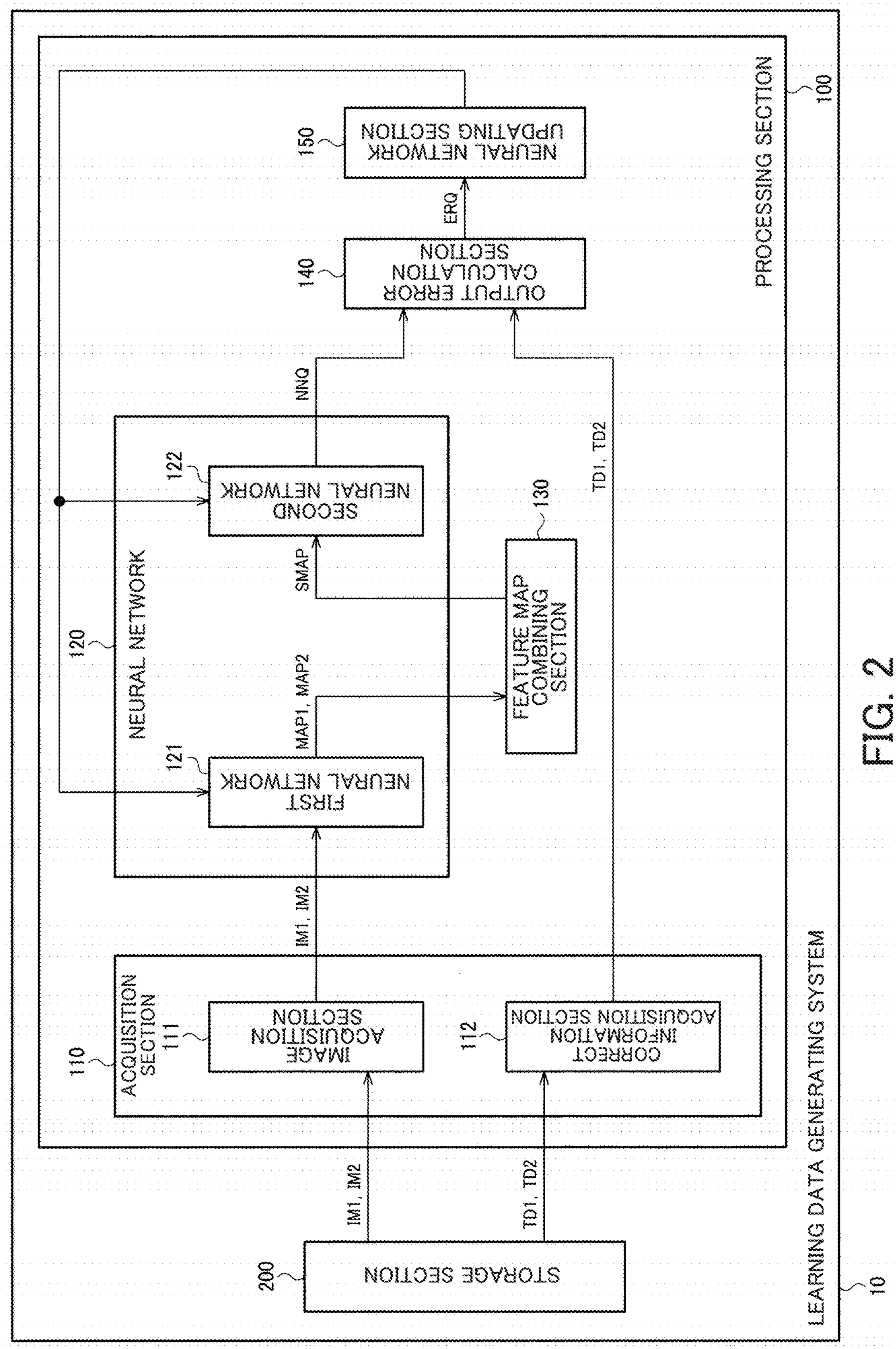
FIG. 2 illustrates a first configuration example of a learning data generating system.
Figure 3:
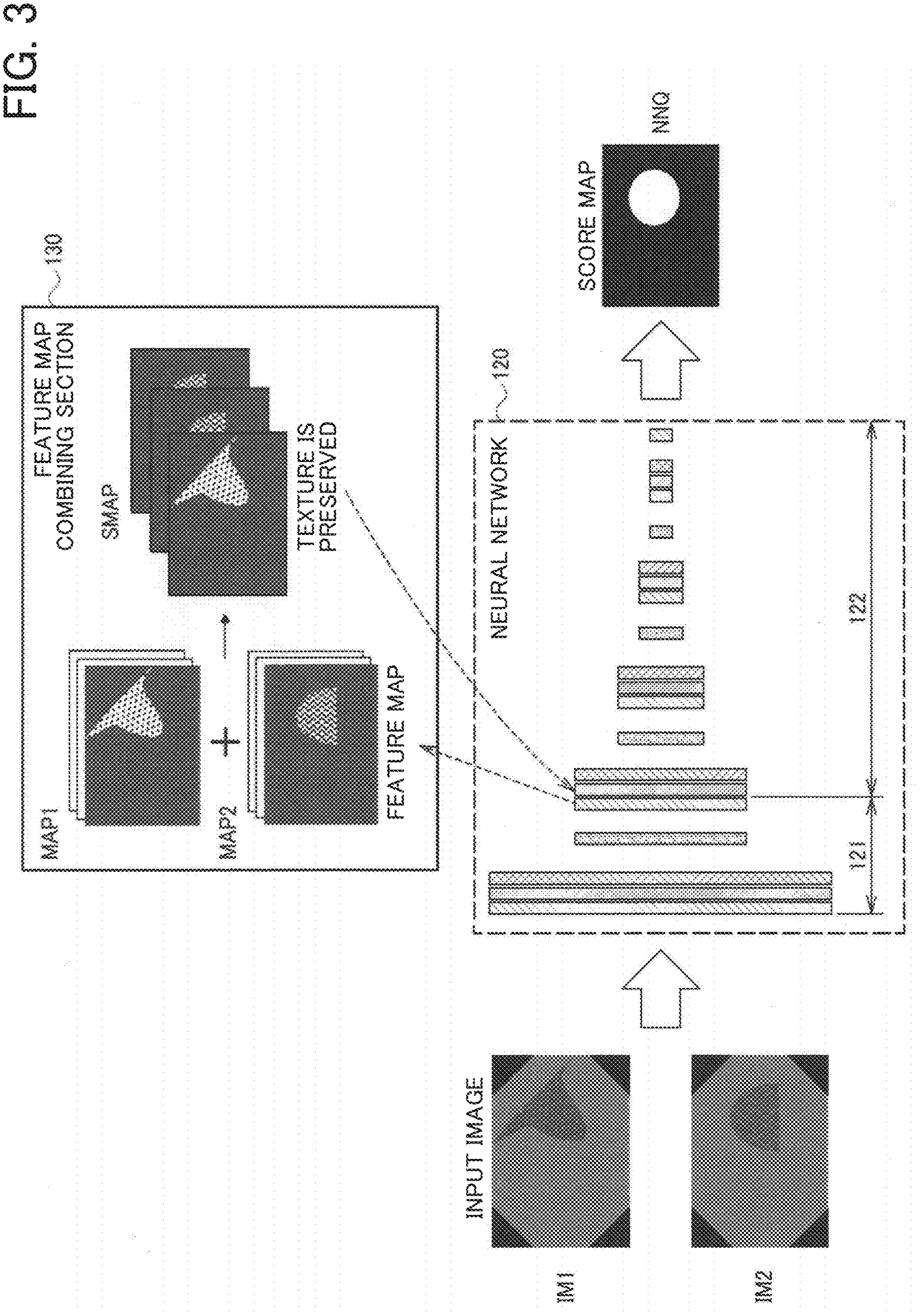
FIG. 3 is a diagram illustrating processing performed in the learning data generating system.

FIG. 2 illustrates a first configuration example of a learning data generating system 10 according to the present embodiment. The learning data generating system 10 includes an acquisition section 110, a first neural network 121, a second neural network 122, a feature map combining section 130, an output error calculation section 140, and a neural network updating section 150. FIG. 3 is a diagram illustrating processing performed in the learning data generating system 10.

The acquisition section 110 acquires a first image IM1, a second image IM2, first correct information TD1 corresponding to the first image IM1, and second correct information TD2 corresponding to the second image IM2. The first neural network 121 receives input of the first image IM1 to generate a first feature map MAP1, and receives input of the second image IM2 to generate a second feature map MAP2. The feature map combining section 130 replaces a part of the first feature map MAP1 with a part of the second feature map MAP2 to generate a combined feature map SMAP. Note that FIG. 3 illustrates an example where the channels ch2 and ch3 of the first feature map MAP1 are replaced with the channels ch2 and ch3 of the second feature map MAP2. The second neural network 122 generates output information NNQ on the basis of the combined feature map SMAP. The output error calculation section 140 calculates an output error ERQ on the basis of the output information NNQ, the first correct information TD1, and the second correct information TD2. The neural network updating section 150 updates the first neural network 121 and the second neural network 122 on the basis of the output error ERQ.

Here, “replace” means deleting a part of channels or regions in the first feature map MAP1 and disposing a part of channels or regions of the second feature map MAP2 in place of the deleted part of channels or regions. From the viewpoint of the combined feature map SMAP, it can also be said that a part of the combined feature map SMAP is selected from the first feature map MAP1 and a remaining part of the combined feature map SMAP is selected from the second feature map MAP2.

According to the present embodiment, a part of the first feature map MAP1 is replaced with a part of the second feature map MAP2. Consequently, texture of the feature maps is preserved in the combined feature map SMAP without addition with weighting. As a result, as compared with the above-mentioned conventional technology, the feature maps are combined with information of texture being favorably preserved. Consequently, it is possible to improve accuracy of image recognition using AI. Specifically, the padding method through image combination can be used even when, like in lesion discrimination from ultrasonic endoscope images, a subtle difference in lesion texture is necessary to be recognized, and high recognition performance can be obtained even in a case of a small amount of learning data.

Hereinafter, details of the first configuration example will be described. As illustrated in FIG. 2, the learning data generating system 10 includes a processing section 100 and a storage section 200. The processing section 100 includes the acquisition section 110, the neural network 120, the feature map combining section 130, the output error calculation section 140, and the neural network updating section 150.

The learning data generating system 10 is an information processing device such as a personal computer (PC), for example. Alternatively, the learning data generating system 10 may be configured by a terminal device and the information processing device. For example, the terminal device may include the storage section 200, a display section (not shown), an operation section (not show), and the like, the information processing device may include the processing section 100, and the terminal device and the information processing device may be connected to each other via a network. Alternatively, the learning data generating system 10 may be a cloud system in which a plurality of information processing devices connected via a network performs distributed processing.

The storage section 200 stores training data used for learning in the neural network 120. The training data is configured by training images and correct information attached to the training images. The correct information is also called a training label. The storage section 200 is a storage device such as a memory, a hard disc drive, an optical drive, or the like. The memory is a semiconductor memory, which is a volatile memory such as a RAM or a non-volatile memory such as an EPROM.

The processing section 100 is a processing circuit or a processing device including one or a plurality of circuit components. The processing section 100 includes a processor such as a central processing unit (CPU), a graphical processing unit (GPU), a digital signal processor (DSP), or the like. The processor may be an integrated circuit device such as a field programmable gate array (FPGA), an application specific integrated circuit (ASIS), or the like. The processing section 100 may include a plurality of processors. The processor executes a program stored in the storage section 200 to implement a function of the processing section 100. The program includes description of functions of the acquisitions section 110, the neural network 120, the feature map combining section 130, the output error calculation section 140, and the neural network updating section 150. The storage section 200 stores a learning model of the neural network 120. The learning model includes description of algorithm of the neural network 120 and parameters used for the learning model. The parameters include a weighted coefficient between nodes, and the like. The processor uses the learning model to execute an inference process of the neural network 120, and uses the parameters that have been updated through learning to update the parameters stored in the storage section 200.

Figure 4:
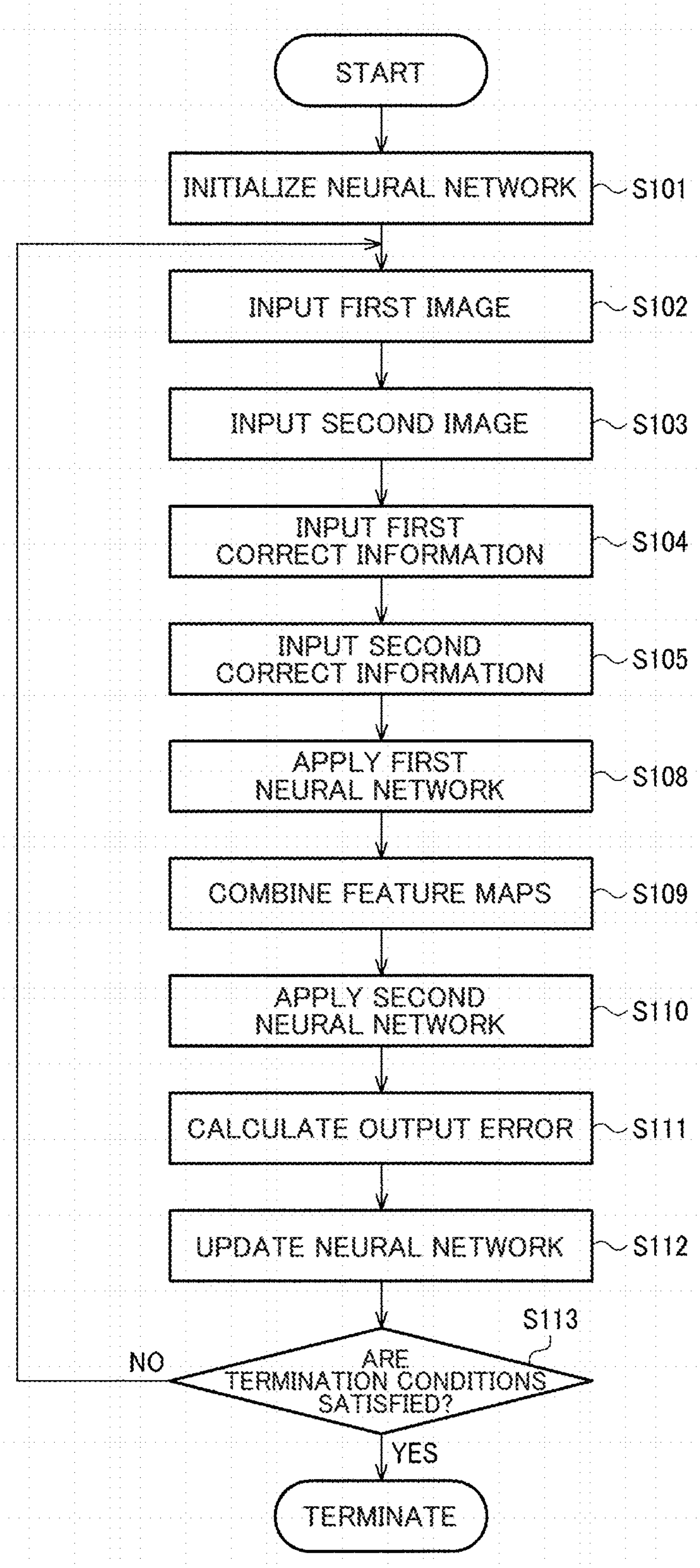
FIG. 4 is a flowchart of processes performed by a processing section in the first configuration example.
Figure 5:
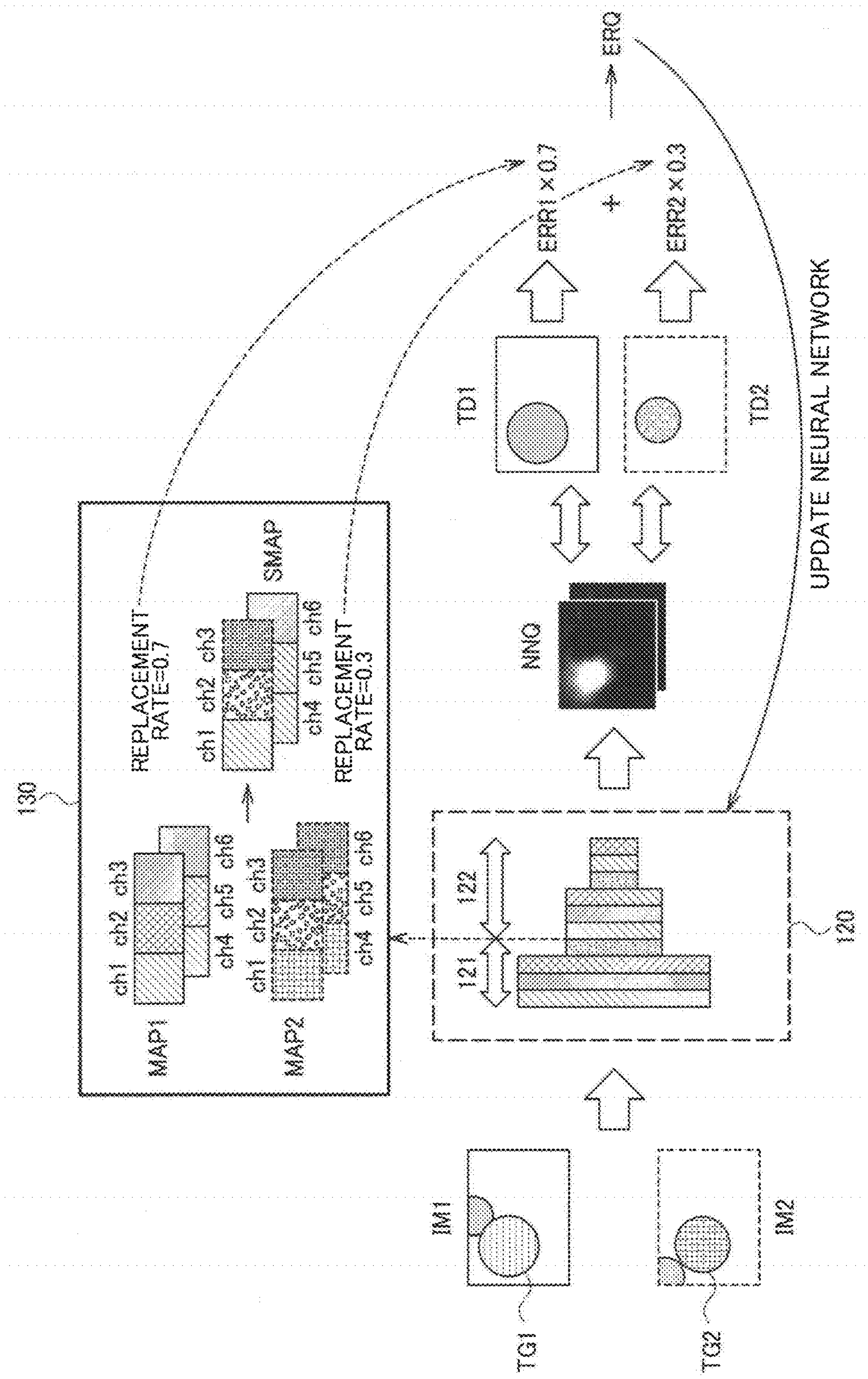
FIG. 5 is a diagram schematically illustrating the processes performed by the processing section in the first configuration example.

FIG. 4 is a flowchart of processes performed by the processing section 100 in the first configuration example, and FIG. 5 is a diagram schematically illustrating the processes.

In step S101, the processing section 100 initializes the neural network 120. In steps S102 and S103, the first image IM1 and the second image IM2 are input to the processing section 100. In steps S104 and S105, the first correct information TD1 and the second correct information TD2 are input to the processing section 100. Steps S102 to S105 may be executed in random order without being limited to the execution order illustrated in FIG. 4, or may be executed in a parallel manner.

Specifically, the acquisition section 110 includes an image acquisition section 111 that acquires the first image IM1 and the second image IM2 from the storage section 200 and a correct information acquisition section 112 that acquires the first correct information TD1 and the second correct information TD2 from the storage section 200. The acquisition section 110 is, for example, an access control section that controls access to the storage section 200.

As illustrated in FIG. 5, a recognition target TG1 appears in the first image IM1, and a recognition target TG2 in a classification category different from that of the recognition target TG1 appears in the second image IM2. In other words, the storage section 200 stores a first training image group and a second training image group that are in different classification categories in image recognition. The classification categories include classifications of organs, parts in an organ, lesions, or the like. The image acquisition section 111 acquires an arbitrary image from the first training image group as the first image IM1, and acquires an arbitrary image from the second training image group as the second image IM2.

In step S108, the processing section 100 applies the first neural network 121 to the first image IM1, and the first neural network 121 outputs a first feature map MAP1. Furthermore, the processing section 100 applies the first neural network 121 to the second image IM2, and the first neural network 121 outputs a second feature map MAP2. In step S109, the feature map combining section 130 combines the first feature map MAP1 with the second feature map MAP2 and outputs the combined feature map SMAP. In step S110, the processing section 100 applies the second neural network 122 to the combined feature map SMAP, and the second neural network 122 outputs the output information NNQ.

Specifically, the neural network 120 is a CNN, and the CNN divided at an intermediate layer corresponds to the first neural network 121 and the second neural network 122. In other words, in the CNN, layers from an input layer to the above-mentioned intermediate layer constitute the first neural network, and layers from an intermediate layer next to the above-mentioned intermediate layer to an output layer constitute the second neural network 122. The CNN has a convolutional layer, a normalization layer, an activation layer, and a pooling layer. Any one of these layers may be used as a border to divide the CNN into the first neural network 121 and the second neural network 122. In deep learning, a plurality of intermediate layers exists. At which intermediate layer of the plurality of layers division is performed may be differentiated for each image input.

FIG. 5 illustrates an example where the first neural network 121 outputs a feature map having six channels. Each channel of the feature map is image data having pixels to which output values of nodes are allocated, respectively. The feature map combining section 130 replaces the channels ch2 and ch3 of the first feature map MAP1 with the channels ch2 and ch3 of the second feature map MAP2. In other words, channels ch1, ch4, ch5, and ch6 of the first feature map MAP1 are allocated to a part of channels ch1, ch4, ch5, and ch6 of the combined feature map SMAP, and channels ch2 and ch3 of the second feature map MAP 2 are allocated to a remaining part of channels ch2 and ch3 of the combined feature map SMAP.

A rate of each feature map in the combined feature map SMAP is referred to as a replacement rate. The replacement rate of the first feature map MAP1 is 4/6≈0.7, and the replacement rate of the second feature map MAP2 is 2/6≈0.3. Note that the number of channels of the feature maps is not limited to six. Furthermore, a channel to be replaced and the number of channels to be replaced are not limited to the example of FIG. 5. For example, the channel and the number may be set at random for each image input.

The output information NNQ to be output by the second neural network 122 is data called a score map. When a plurality of classification categories exists, the score map has a plurality of channels, and an individual channel corresponds to an individual classification category. FIG. 5 illustrates an example where two classification categories exist. Each channel of the score map is image data having pixels to which estimation values are allocated. The estimation value is a value indicating probability that the recognition target has been detected in the pixel.

In step S111 of FIG. 4, the output error calculation section 140 calculates the output error ERQ on the basis of the output information NNQ, the first correct information TD1, and the second correct information TD2. As illustrated in FIG. 5, the output error calculation section 140 calculates a first output error ERR1 indicating an error between the output information NNQ and the first correct information TD1 and a second output error ERR2 indicating an error between the output information NNQ and the second correct information TD2. The output error calculation section 140 calculates the output error ERQ through addition with weighting performed at a replacement rate of the first output error ERR1 and the second output error ERR2. In the example of FIG. 5, the following relation is satisfied: ERQ=ERR1×0.7+ERR2+0.3.

In step S112 of FIG. 4, the neural network updating section 150 updates the neural network 120 on the basis of the output error ERQ. Updating the neural network 120 means updating parameters such as a weighted coefficient between nodes. As an updating method, a variety of publicly-known methods such as a back propagation method can be adopted. In step S113, the processing section 100 determines whether or not termination conditions of learning are satisfied. The termination conditions include the output error ERQ that has become equal to or lower than a predetermined output error, learning of the predetermined number of images, and the like. The processing section 100 terminates the processes of this flow when the termination conditions are satisfied, whereas the processing section 100 returns to step S102 when the termination conditions are not satisfied.

Figure 6:
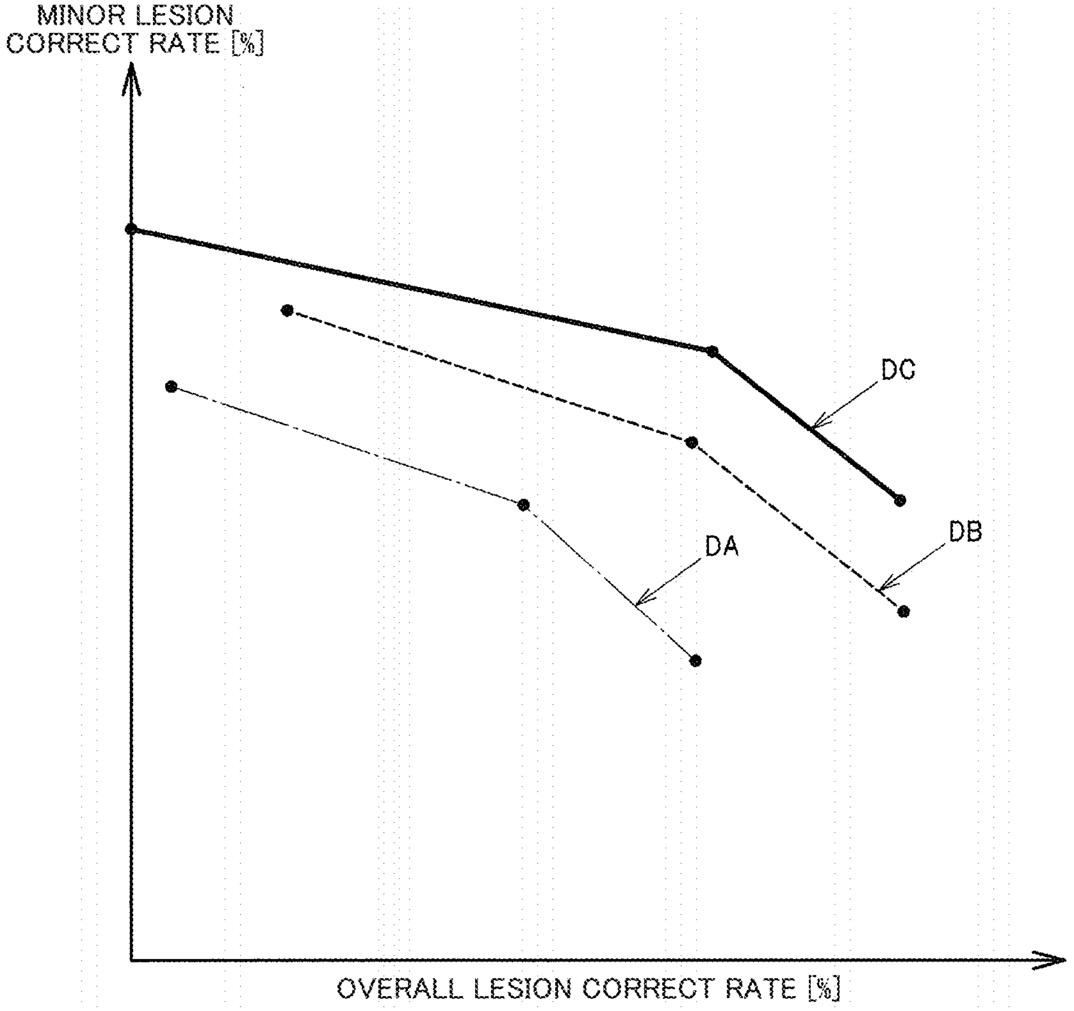
FIG. 6 illustrates simulation results of image recognition with respect to lesions.

FIG. 6 illustrates simulation results of image recognition with respect to lesions. The horizontal axis represents a correct rate with respect to lesions of all classification categories as recognition targets. The vertical axis represents a correct rate with respect to minor lesions among the classification categories as the recognition targets. DA represents a simulation result of a conventional method of padding the learning data out merely from a single image. DB represents a simulation result of Manifold Mixup. DC represents a simulation result of the method according to the present embodiment. Put on the respective results are plots of three points, which are results of simulations performed with differentiating offsets with respect to detection of minor lesions.

In FIG. 6, as closer to the upper right, i.e., toward a direction in which both an overall lesion correct rate and a minor lesion correct rate increase in the graph, performance of the image recognition is more superior. The simulation result DC using the method of the present embodiment is positioned closer to the upper right than the simulation results DA and DB using the conventional method, which means more accurate image recognition than that of the conventional technology is made possible.

Note that replacement of a part of the first feature map MAP1 leads to loss of information contained in the part. However, because the number of channels of the intermediate layers is set to a rather large number, information possessed by output of the intermediate layers is redundant. Consequently, even when the part of information is lost as a result of replacement, it matters very little.

Furthermore, even when addition with weighting has not been performed in combining the feature maps, linear combination between the channels is performed in the middle layer of the latter stage. However, the weighted coefficient of this linear combination is a parameter to be updated in learning of the neural network. Consequently, the weighted coefficient is expected to be optimized in learning so as not to lose small differences in texture.

According to the present embodiment described above, the first feature map MAP1 includes a first plurality of channels, and the second feature map MAP2 includes a second plurality of channels. The feature map combining section 130 replaces the whole of a part of the first plurality of channels with the whole of a part of the second plurality of channels.

As a result, by replacing the whole of a part of the channels, a part of the first feature map MAP1 can be replaced with a part of the second feature map MAP2. While different texture is extracted for respective channels, texture is mixed in such a manner that the first image IM1 is selected for certain texture and the second image IM2 is selected for another texture.

Alternatively, the feature map combining section 130 may replace a partial region of a channel included in the first plurality of channels with a partial region of a channel included in the second plurality of channels.

By doing so, the partial region of the channel instead of the whole of the channel can be replaced. As a result, by replacing, for example, merely a region where the recognition target exists, it is possible to generate a combined feature map seemed to fit, in a background of one feature map, the recognition target of the other feature map. Alternatively, by replacing a part of the recognition target, it is possible to generate a combined feature map seemed to combine recognition targets of two feature maps.

The feature map combining section 130 may replace a band-like region of a channel included in the first plurality of channels with a band-like region of a channel included in the second plurality of channels. Note that a method for replacing the partial region of the channel is not limited to the above. For example, the feature map combining section 130 may replace a region set to be periodic in a channel included in the first plurality of channels with a region set to be periodic in a channel included in the second plurality of channels. The region set to be periodic is, for example, a striped region, a checkered-pattern region, or the like.

By doing so, it is possible to mix the channel of the first feature map and the channel of the second feature map while retaining texture of each channel. For example, in a case where the recognition target in the channel is cut out and replaced, it is required that positions of the recognition targets in the first image IM1 and the second image IM2 conform to each other. According to the present embodiment, even when the positions of the recognition targets do not conform between the first image IM1 and the second image IM2, it is possible to mix the channels while retaining texture of the recognition targets.

The feature map combining section 130 may determine a size of the partial region to be replaced in the channel included in the first plurality channels on the basis of classification categories of the first image and the second image.

By doing so, it is possible to replace the feature map in a region having a size corresponding to the classification category of the image. For example, when a size specific to a recognition target such as a lesion in a classification category is predefined, the feature map is replaced in a region having the specific size. As a result, it is possible to generate, for example, a combined feature map seemed to fit, in a background of one feature map, the recognition target of the other feature map.

Furthermore, according to the present embodiment, the first image IM1 and the second image IM2 are ultrasonic images. Note that a system for performing learning based on the ultrasonic images will be described later referring to FIG. 13 and the like.

The ultrasonic image is normally a monochrome image, which requires texture as an important element in image recognition. The present embodiment enables highly-accurate image recognition based on a subtle difference in texture, and makes it possible to generate an image recognition system appropriate for ultrasonic diagnostic imaging. Note that the application target of the present embodiment is not limited to the ultrasonic image, and application to various medical images is allowed. For example, the method of the present embodiment is also applicable to medical images acquired by an endoscope system that captures images using an image sensor.

Furthermore, according to the present embodiment, the first image IM1 and the second image IM2 are classified into different classification categories.

In an intermediate layer, the first feature map MAP1 and the second feature map MAP2 are combined, and learning is performed. Consequently, a boundary between the classification category of the first image IM1 and the classification category of the second image IM2 is learned. According to the present embodiment, combination is performed without losing a subtle difference in texture of the feature maps, and the boundary of the classification categories is appropriately learned. For example, the classification category of the first image IM1 and the classification category of the second image IM2 are a combination difficult to be discriminated in an image recognition process. By learning a boundary of such classification categories using the method of the present embodiment, recognition accuracy of classification categories difficult to be discriminated improves. Furthermore, the first image IM1 and the second image IM2 may be classified into the same classification category. By combining recognition targets whose classification categories are same but features are different, it is possible to generate image data having greater diversity in the same category.

Furthermore, according to the present embodiment, the output error calculation section 140 calculates the first output error ERR1 on the basis of the output information NNQ and the first correct information TD1, calculates the second output error ERR2 on the basis of the output information NNQ and the second correct information TD2, and calculates a weighted sum of the first output error ERR1 and the second output error ERR2 as the output error ERQ.

For the first feature map MAP1 and the second feature map MAP2 are combined in the intermediate layer, the output information NNQ constitutes information in which an estimation value to the classification category of the first image IM1 and an estimation value to the classification category of the second image IM2 are subjected to addition with weighting. According to the present embodiment, a weighted sum of the first output error ERR1 and the second output error ERR2 is calculated to thereby obtain the output error ERQ corresponding to the output information NNQ.

Furthermore, according to the present embodiment, the feature map combining section 130 replaces a part of the first feature map MAP1 with a part of the second feature map MAP2 at a first rate. The firs rate corresponds to the replacement rate 0.7 described referring to FIG. 5. The output error calculation section 140 calculates a weighted sun of the first output error ERR1 and the second output error ERR2 by weighting based on the first rate, and the calculated weighted sum is defined as the output error ERQ.

The above-mentioned weighting of the estimation values in the output information NNQ is weighting according to the first rate. According to the present embodiment, the weighting based on the first rate is used to calculate the weighted sum of the first output error ERR1 and the second output error ERR2, to thereby obtain the output error ERQ corresponding to the output information NNQ.

Specifically, the output error calculation section 140 calculates the weighted sum of the first output error ERR1 and the second output error ERR2 at a rate same as the first rate.

The above-mentioned weighting of the estimation values in the output information NNQ is expected to be a rate same as the first rate. According to the present embodiment, the weighted sum of the first output error ERR1 and the second output error ERR2 is calculated at the rate same as the first rate, thereby weighting of the estimation values in the output information NNQ is fed back so as to become the first rate as an expected value.

Alternatively, the output error calculation section 140 may calculate the weighted sum of the first output error ERR1 and the second output error ERR2 at a rate different from the first rate.

Specifically, the weighting may be performed so that the estimation value of a minor category such as a rare lesion is offset in a forward direction. For example, when the first image IM1 is an image of a rare lesion, and the second image IM2 is an image of a non-rare lesion, the weighting of the first output error ERR1 is made lager than the first rate. According to the present embodiment, feedback is performed so as to facilitate detection of the minor category to which recognition accuracy is difficult to be improved.

Note that the output error calculation section 140 may generate correct probability distribution from the first correct information TD1 and the second correct information TD2 and define KL divergence calculated from the output information NNQ and the correct probability distribution as the output error ERQ.

2. Second Configuration Example

Figure 7:
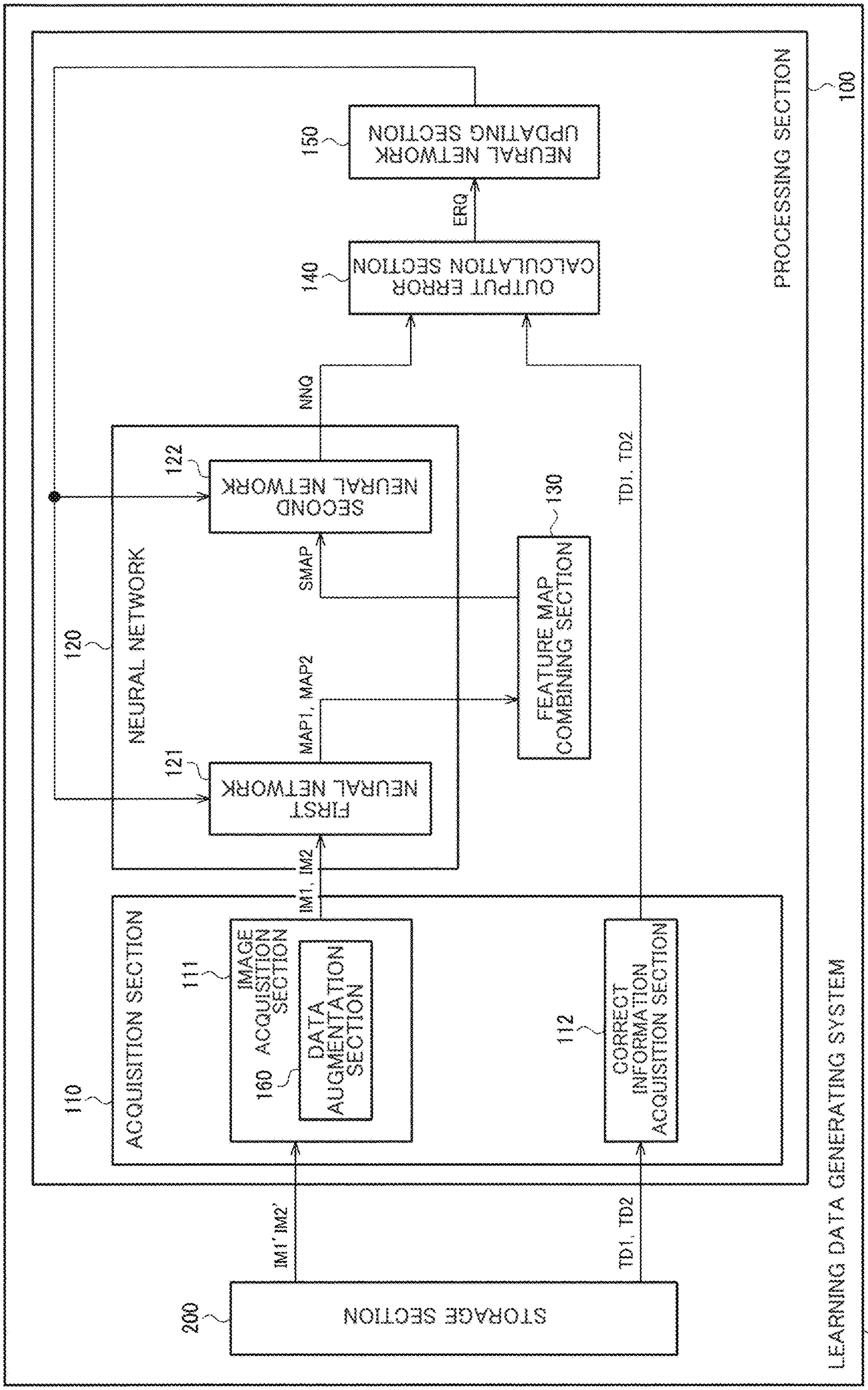
FIG. 7 illustrates a second configuration example of the learning data generating system.
Figure 8:
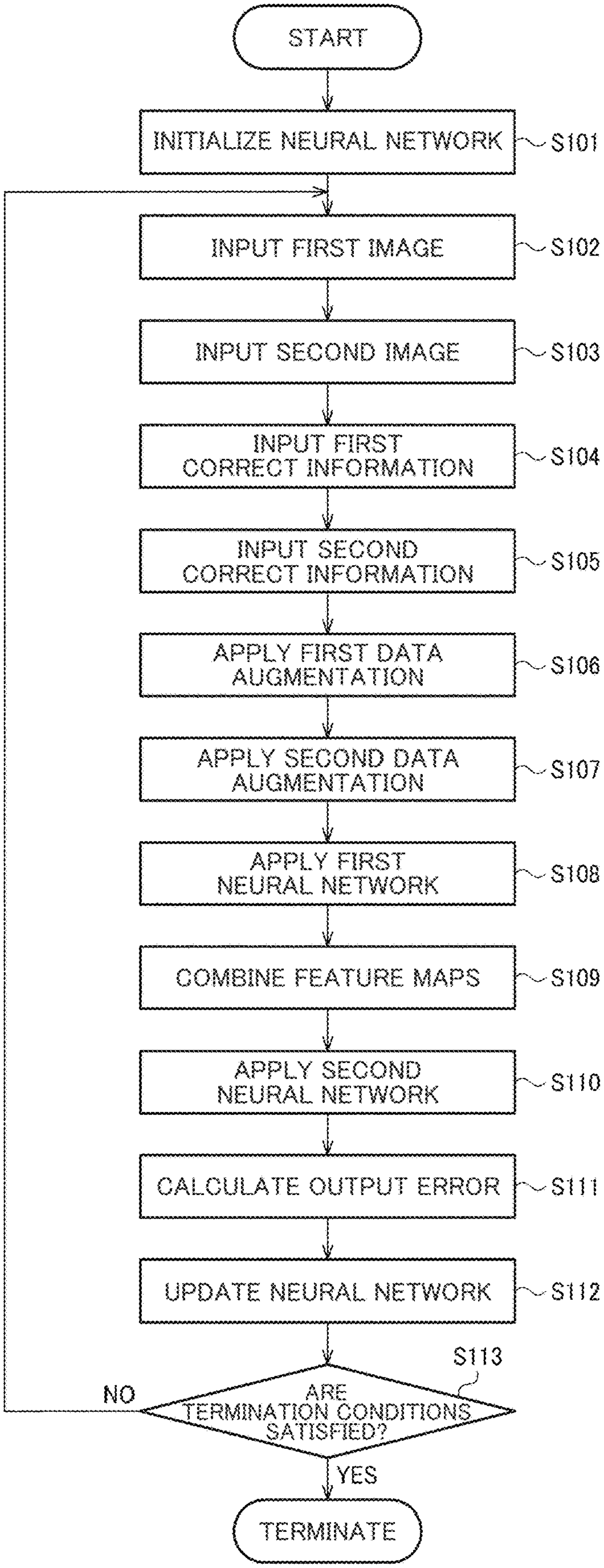
FIG. 8 is a flowchart of processes performed by the processing section in the second configuration example.
Figure 9:
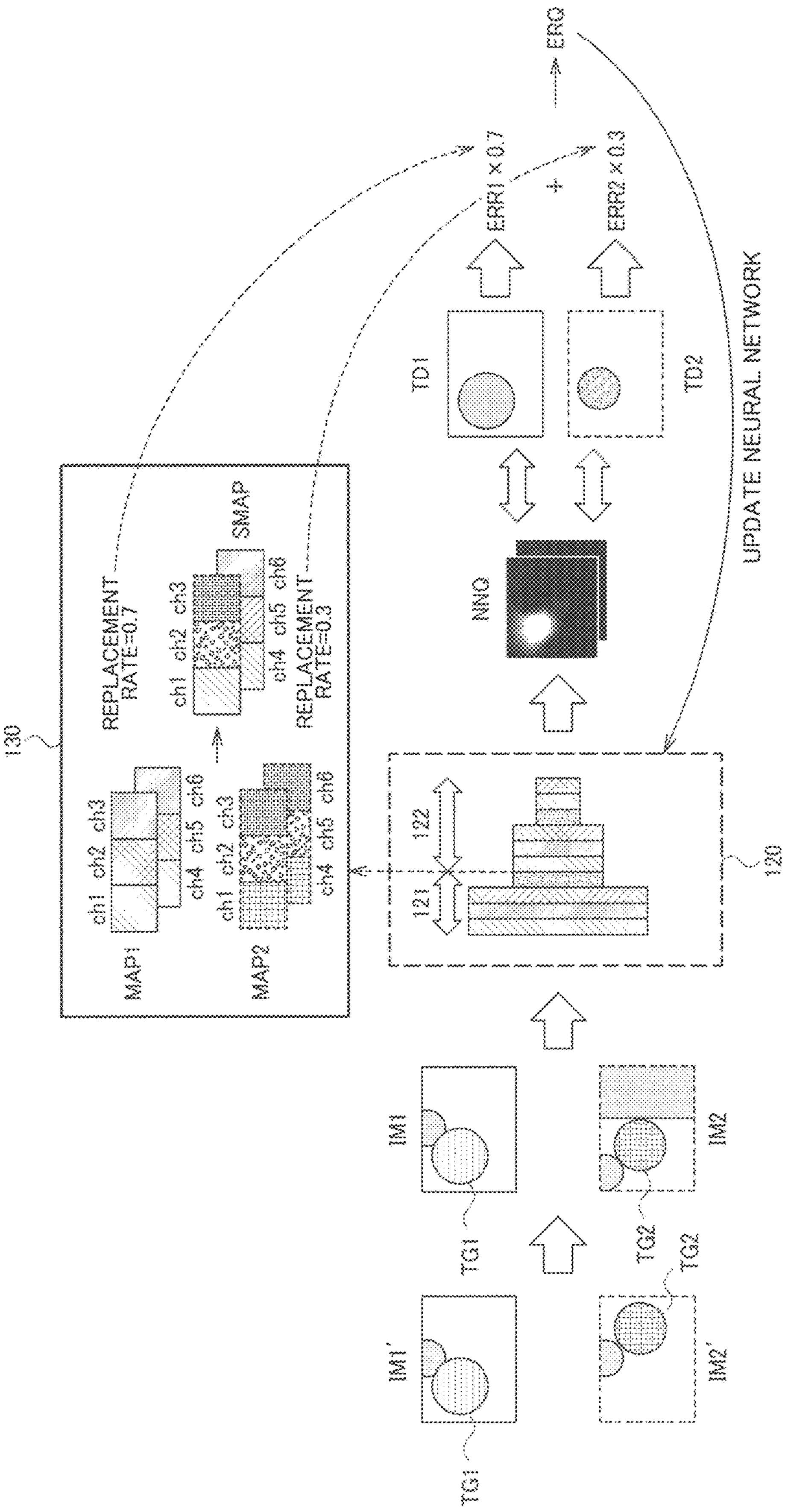
FIG. 9 is a diagram schematically illustrating the processes performed by the processing section in the second configuration example.

FIG. 7 illustrates a second configuration example of the learning data generating system 10. In FIG. 7, the image acquisition section 111 includes a data augmentation section 160. FIG. 8 is a flowchart of processes performed by the processing section 100 in the second configuration example, and FIG. 9 is a diagram schematically illustrating the processes. Note that components and steps described in the first configuration example are denoted with the same reference numerals and description about the components and the steps is omitted as appropriate.

The storage section 200 stores a first input image IM1' and a second input image IM2'. The image acquisition section 111 reads the first input image IM1' and the second input image IM2' from the storage section 200. The data augmentation section 160 performs at least one of a first augmentation process of subjecting the first input image IM1' to data augmentation to generate the first image IM1 and a second augmentation process of subjecting the second input image IM2' to data augmentation to generate the second image IM2.

The data augmentation is image processing with respect to input images of the neural network 120. For example, the data augmentation is a process of converting input images into images suitable for learning, image processing for generating images with different appearance of a recognition target to improve accuracy of learning, or the like. According to the present embodiment, at least one of the first input image IM1' and the second input image IM2' is subjected to data augmentation to enable effective learning.

In the flow of FIG. 8, the data augmentation section 160 performs, in step S106, data augmentation of the first input image IM1' and performs, in step S107, data augmentation of the second input image IM2'. Instead, both or at least one of steps S106 and S107 may be performed.

FIG. 9 illustrates an example of executing merely the second augmentation process of augmenting data of the second input image IM2'. The second augmentation process includes a process of performing position correction of the second recognition target TG2 with respect to the second input image IM2' on the basis of a positional relationship between the first recognition target TG1 appearing in the first input image IM1' and the second recognition target TG2 appearing in the second input image IM2'.

The position correction is affine transformation including parallel movement. The data augmentation section 160 grasps the position of the first recognition target TG1 from the first correct information TD1 and grasps the position of the second recognition target TG2 from the second correct information TD2, and performs correction so as to make the positions conform to each other. For example, the data augmentation section 160 performs position correction so as to make a barycentric position of the first recognition target TG1 and a barycentric position of the second recognition target TG2 conform to each other.

Similarly, the first augmentation process includes a process of performing position correction of the first recognition target TG1 with respect to the first input image IM1' on the basis of a positional relationship between the first recognition target TG1 appearing in the first input image IM1' and the second recognition target TG2 appearing in the second input image IM2'.

According to the present embodiment, the position of the first recognition target TG1 in the first image IM1 and the position of the second recognition target TG2 in the second image IM2 conform to each other. As a result, the position of the first recognition target TG1 and the position of the second recognition target TG2 conform to each other also in the combined feature map SMPA in which the feature maps have been replaced, and therefore it is possible to appropriately learn the boundary of the classification categories.

The first augmentation process and the second augmentation process are not limited to the above-mentioned position correction. For example, the data augmentation section 160 may perform at least one of the first augmentation process and the second augmentation process by at least one process selected from color correction, brightness correction, a smoothing process, a sharpening process, noise addition, and affine transformation.

3. CNN

As described above, the neural network 120 is a CNN. Hereinafter, a basic configuration of the CNN will be described.

Figure 10:
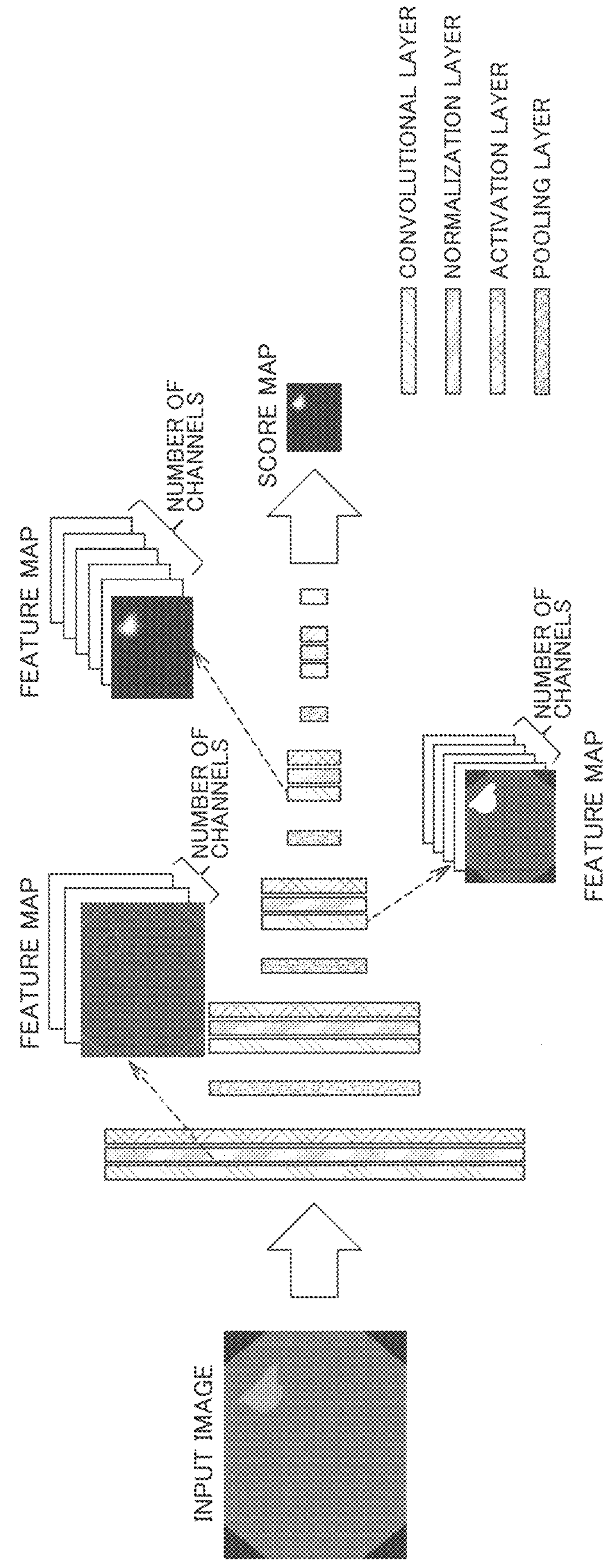
FIG. 10 illustrates an overall configuration example of a CNN.

FIG. 10 illustrates an overall configuration example of the CNN. The input layer of the CNN is a convolutional layer followed by a normalization layer and an activation layer. Next, a pooling layer, a convolutional layer, a normalization layer, and an activation layer constitute one set, and the same sets are repeated. The output layer of the CNN is a convolutional layer. The convolutional layer outputs a feature map by performing a convolutional process with respect to input. There is a tendency that the number of channels of the feature map increases and the size of the image of one channel decreases in the convolutional layers of the latter stages.

Each layer of the CNN includes a node, and an internode between the node and a node of the next layer is joined by a weighted coefficient. The weighted coefficient of the internode is updated based on the output error, and consequently learning of the neural network 120 is performed.

Figure 11:
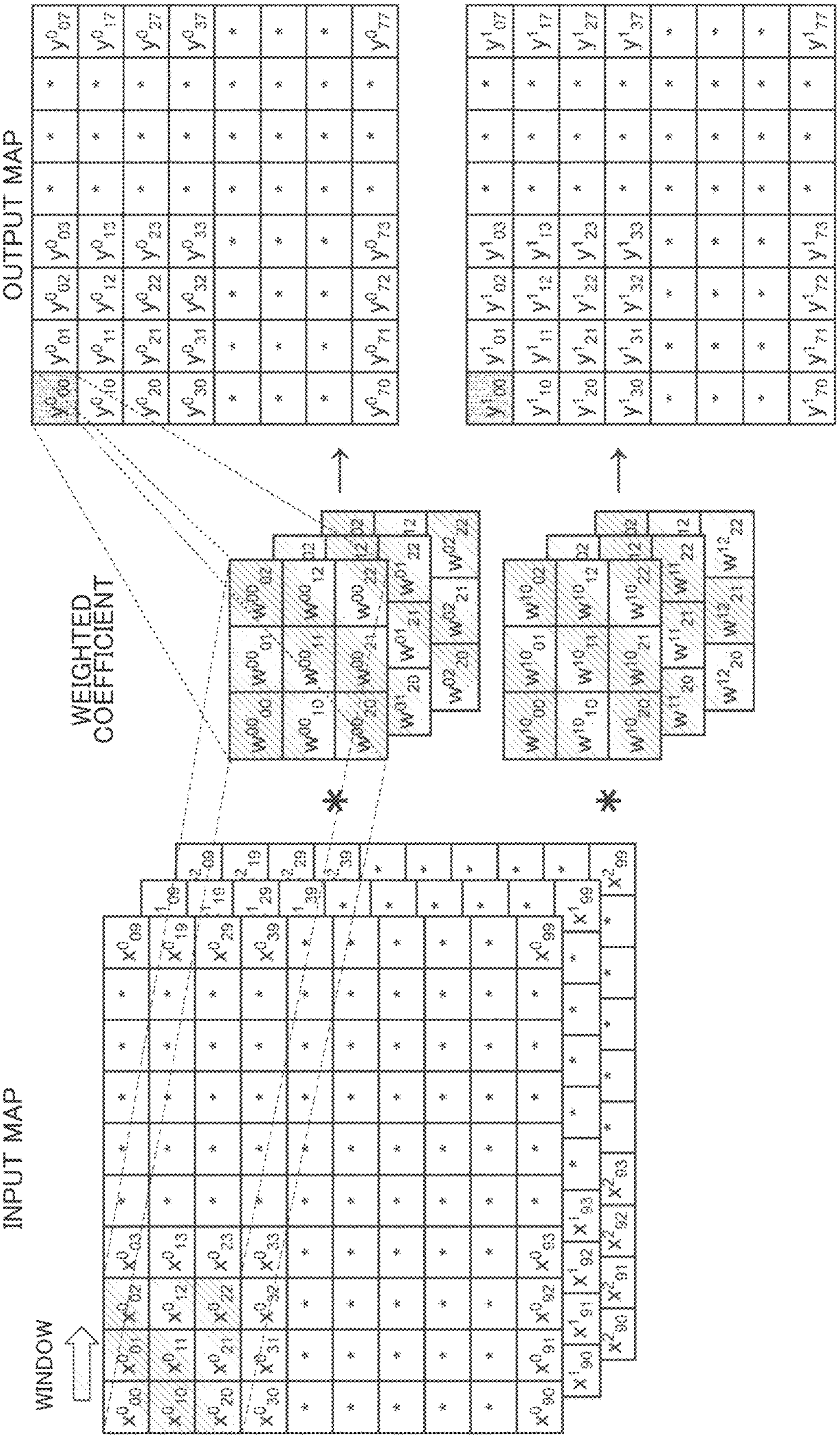
FIG. 11 illustrates an example of a convolutional process.

FIG. 11 illustrates an example of the convolutional process. Here, description is made to the example where an output map of two channels is generated from an input map of three channels and a filter size of the weighted coefficient is 3×3. In the input layer, the input map corresponds to an input image. In the output layer, the output map corresponds to a score map. In the intermediate layer, both the input map and the output map are feature maps.

Through convolution operation of a weighted coefficient filter of three channels with respect to the input map of three channels, one channel of the output map of is generated. There are two sets of weighted coefficient filter of three channels, and the output map of two channels is obtained. In the convolution operation, a sum of products of a 3×3 window of the input map and the weighted coefficient are calculated, and the window is sequentially slid by one pixel, and a sum of products of the entire input map is operated. Specifically, the following expression (1) is operated:

[Mathematical 1]

$$y^{oc}_{n,m} = \sum_{ic=0}^{2}\sum_{j}^{2}\sum_{i}^{2} w^{oc,ic}_{j,i} \times x^{ic}_{n+j,m+i} \quad (1)$$

$y^{oc}_{n,m}$ is a value arranged in an n-th row and an m-th column of a channel oc in the output map. $w^{oc,ic}_{j,i}$ is a value arranged in a j-th row and an i-th column of a channel ic of a set oc in the weighted coefficient filter. $x^{ic}_{n+j,m+i}$ is a value arranged in an n+j-th row and an m+i-th column of the channel ic in the input map.

Figure 12:
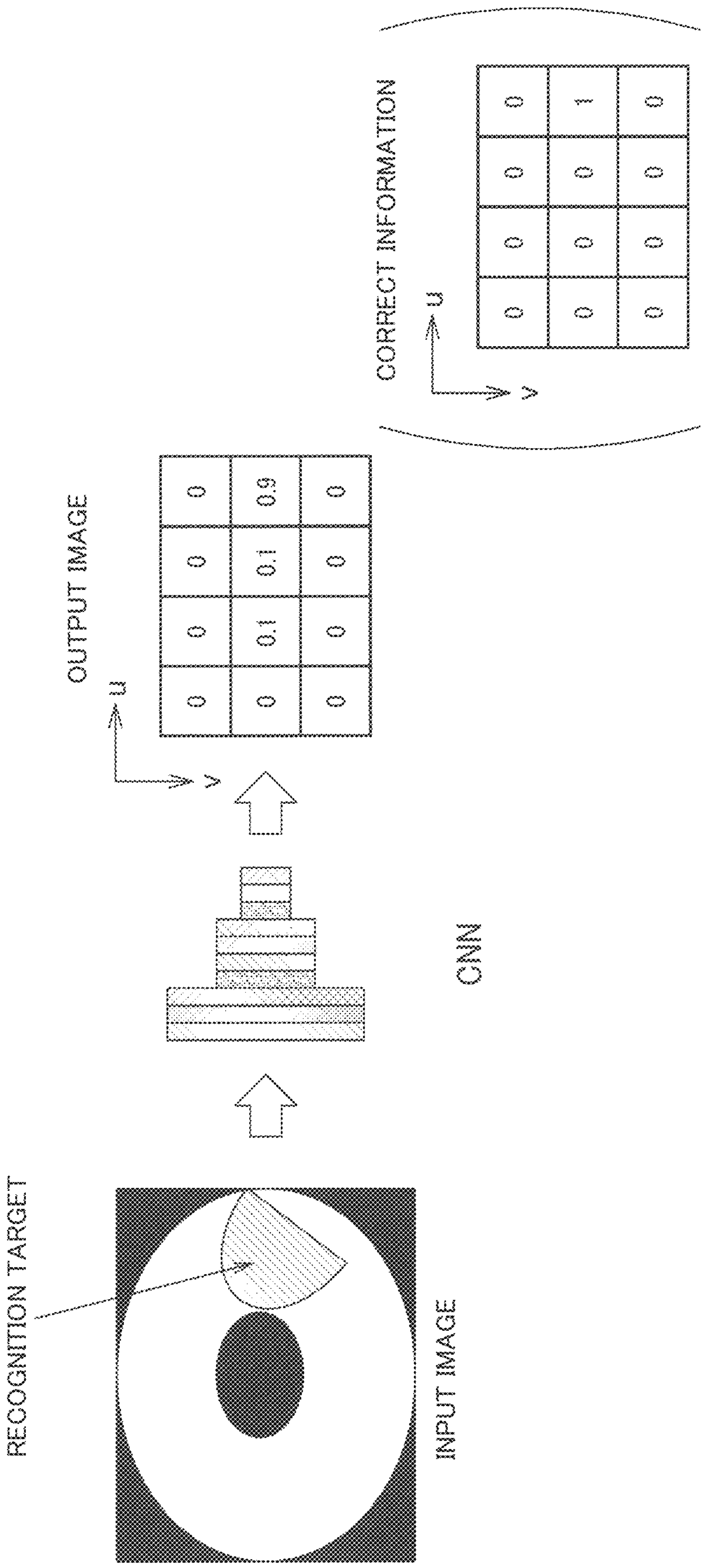
FIG. 12 illustrates an example of a recognition result output by the CNN.

FIG. 12 illustrates an example of a recognition result output by the CNN. The output information, which indicates the recognition result output from the CNN, is a score map in which estimation values are allocated to respective positions (u, v). The estimation value indicates probability that the recognition target has been detected at that position. The correct information is mask information that indicates an ideal recognition result in which a value 1 is allocated to a position (u, v) where the recognition target exists. In an update process of the neural network 120, the above-mentioned weighted coefficient is updated so as to make the error between the correct information and the output information smaller.

4. Ultrasonic Diagnostic System

Figure 13:
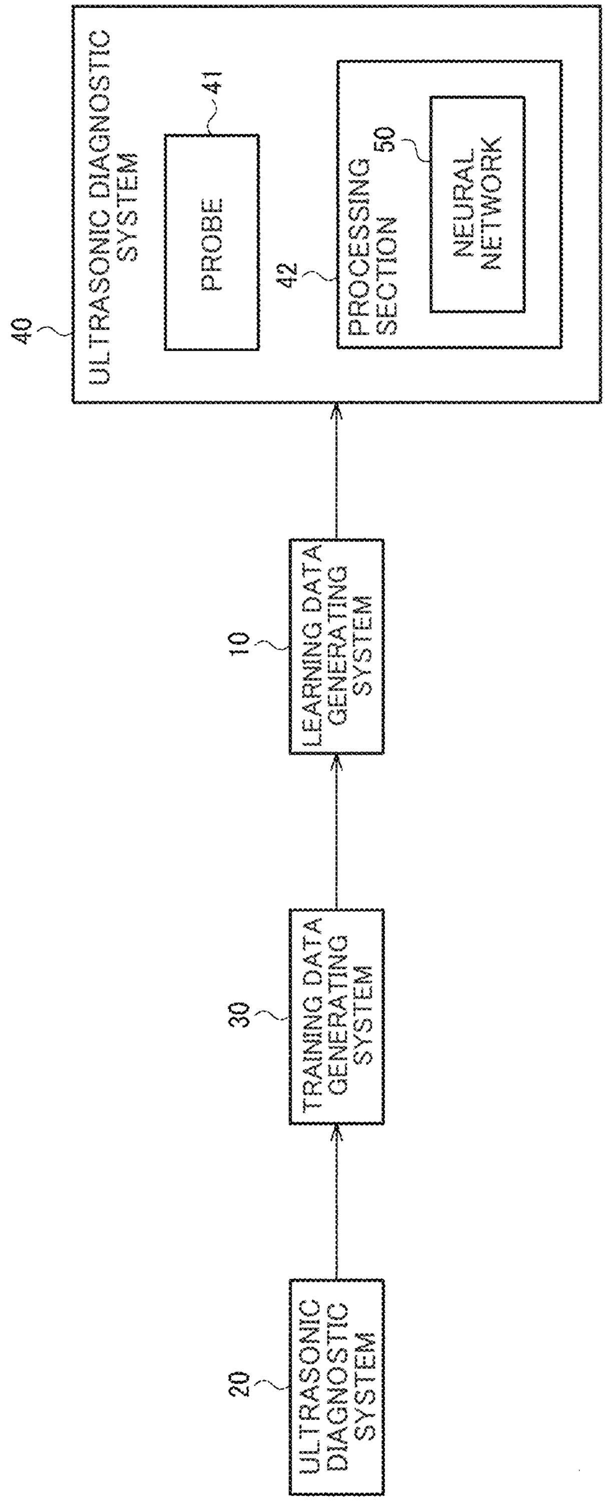
FIG. 13 illustrates a system configuration example when an ultrasonic image is input to the learning data generating system.

FIG. 13 illustrates a system configuration example when an ultrasonic image is input to the learning data generating system 10. The system illustrated in FIG. 13 includes an ultrasonic diagnostic system 20, a training data generating system 30, the learning data generating system 10, and an ultrasonic diagnostic system 40. Note that those systems are not necessarily in always-on connection, and may be connected as appropriate at each stage of operation.

The ultrasonic diagnostic system 20 captures an ultrasonic image as a training image, and transfers the captured ultrasonic image to the training data generating system 30. The training data generating system 30 displays the ultrasonic image on a display, accepts input of correct information from a user, associates the ultrasonic image with the correct information to generate training data, and transfers the training data to the learning data generating system 10. The learning data generating system 10 performs learning of the neural network 120 on the basis of the training data and transfers a learned model to the ultrasonic diagnostic system 40.

The ultrasonic diagnostic system 40 may be the same system as the ultrasonic diagnostic system 20, or may be a different system. The ultrasonic diagnostic system 40 includes a probe 41 and a processing section 42. The probe 41 detects ultrasonic echoes from a subject. The processing section 42 generates an ultrasonic image on the basis of the ultrasonic echoes. The processing section 42 includes a neural network 50 that performs an image recognition process based on the learned model to the ultrasonic image. The processing section 42 displays a result of the image recognition process on the display.

Figure 14:
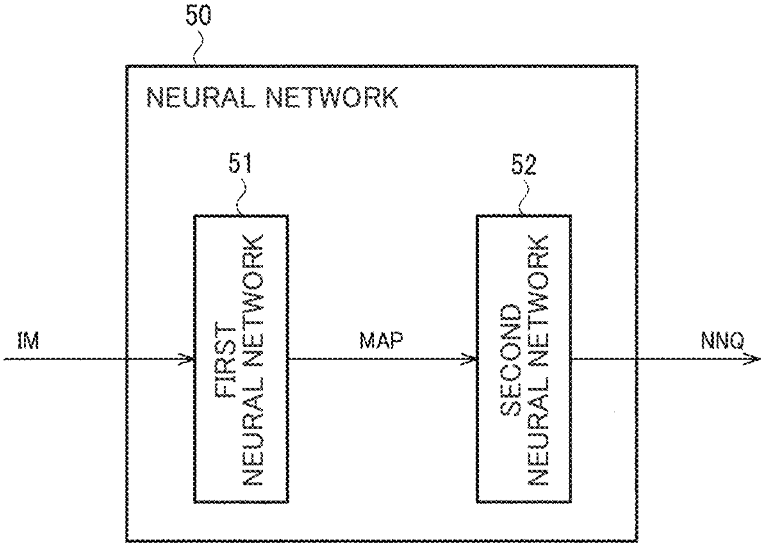
FIG. 14 illustrates a configuration example of a neural network in an ultrasonic diagnostic system.

FIG. 14 is a configuration example of the neural network 50. The neural network 50 has algorithm same as that of the neural network 120 of the learning data generating system 10 and uses parameters such as the weighted coefficient included in the learned model to thereby perform an image recognition process reflecting a learning result in the learning data generating system 10. A first neural network 51 and a second neural network 52 correspond to the first neural network 121 and the second neural network 122 of the learning data generating system 10, respectively. A single image IM is input to the first neural network 51 and a feature map MAP corresponding to the image IM is output from the first neural network 51. In the ultrasonic diagnostic system 40, combination of feature maps is not performed. Therefore, the feature map MAP output by the first neural network 51 serves as input of the second neural network 52. Note that, although FIG. 14 illustrates the first neural network 51 and the second neural network 52 for comparison with the learning data generating system 10, the neural network 50 is not divided in an actual process.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

What is claimed is:

1. A learning data generating system comprising a processor, the processor being configured to implement:

acquiring a first image, a second image, first correct information corresponding to the first image, and second correct information corresponding to the second image;

inputting the first image to a first neural network to generate a first feature map by the first neural network and inputting the second image to the first neural network to generate a second feature map by the first neural network;

generating a combined feature map by deleting a part of the first feature map and placing a part of the second feature map in place of the deleted part of the first feature map;

inputting the combined feature map to a second neural network to generate output information by the second neural network;

determining an output error based on the output information, the first correct information, and the second correct information; and updating the first neural network and the second neural network based on the output error.

2. The learning data generating system as defined in claim 1, wherein:

the first feature map includes a first plurality of channels, the second feature map includes a second plurality of channels, and the processor implements replacing the whole of a part of the first plurality of channels with the whole of a part of the second plurality of channels.

3. The learning data generating system as defined in claim 2, wherein:

the first image and the second image are ultrasonic images.

4. The learning data generating system as defined in claim 1, wherein:

the processor implements:

calculating a first output error based on the output information and the first correct information, calculating a second output error based on the output information and the second correct information, and calculating a weighted sum of the first output error and the second output error as the output error.

5. The learning data generating system as defined in claim 1, wherein:

the processor implements:

at least one of a first augmentation process of subjecting a first input image to data augmentation to generate the first image and a second augmentation process of subjecting a second input image to data augmentation to generate the second image.

6. The learning data generating system as defined in claim 5, wherein:

the first augmentation process includes:

a process of performing, on the basis of a positional relationship between a first recognition target appearing in the first input image and a second recognition target appearing in the second input image, position correction of the first recognition target with respect to the first input image, and the second augmentation process includes:

a process of performing, on the basis of the positional relationship, position correction of the second recognition target with respect to the second input image.

7. The learning data generating system as defined in claim 5, wherein:

the processor implements:

at least one of the first augmentation process and the second augmentation process by at least one process selected from color correction, brightness correction, a smoothing process, a sharpening process, noise addition, and affine transformation.

8. The learning data generating system as defined in claim 1, wherein:

the first feature map includes a first plurality of channels, the second feature map includes a second plurality of channels, and the processor implements:

replacing a partial region of a channel included in the first plurality of channels with a partial region of a channel included in the second plurality of channels.

9. The learning data generating system as defined in claim 8, wherein:

the processor implements:

replacing a band-like region of the channel included in the first plurality of channels with a band-like region of the channel included in the second plurality of channels.

10. The learning data generating system as defined in claim 8, wherein:

the processor implements:

replacing a region set to be periodic in the channel included in the first plurality of channels with a region set to be periodic in the channel included in the second plurality of channels.

11. The learning data generating system as defined in claim 8, wherein:

the processor implements:

determining a size of the partial region to be replaced in the channel included in the first plurality of channels on the basis of classification categories of the first image and the second image.

12. The learning data generating system as defined in claim 1, wherein;

the processor implements:

replacing a part of the first feature map with a part of the second feature map at a first rate; and calculating a first output error based on the output information and the first correct information, calculating a second output error based on the output information and the second correct information, calculating a weighted sum of the first output error and the second output error by weighting based on the first rate, and defining the weighted sum as the output error.

13. The learning data generating system as defined in claim 12, wherein:

the processor implements:

calculating the weighted sum of the first output error and the second output error at a rate same as the first rate.

14. The learning data generating system as defined in claim 12, wherein;

the processor implements:

calculating the weighted sum of the first output error and the second output error at a rate different from the first rate.

15. The learning data generating system as defined in claim 1, wherein:

the first image and the second image are ultrasonic images.

16. The learning data generating system as defined in claim 1, wherein;

the first image and the second image are classified in different classification categories.

17. The learning data generating system as defined in claim 1, wherein:

the part of the first feature map being deleted is a lesion appearing in the first image as a recognition target; and the part of the second feature map being in place of the deleted part of the first feature map is a different recognition target appearing in the second image.

18. The learning data generating system as defined in claim 1, wherein:

when deleting a channel as a part of the first feature map, the processor sets the channel to be deleted at random for each image input.

19. The learning data generating system as defined in claim 1, wherein:

the first feature map, the second feature map and the combined feature map has same dimensions.

20. A learning data generating method comprising:

acquiring a first image, a second image, first correct information corresponding to the first image, and second correct information corresponding to the second image;

inputting the first image to a first neural network to generate a first feature map and inputting the second image to the first neural network to generate a second feature map;

generating a combined feature map by deleting a part of the first feature map and placing a part of the second feature map in place of the deleted part of the first feature map;

generating, by a second neural network, output information based on the combined feature map;

calculating an output error based on the output information, the first correct information, and the second correct information; and updating the first neural network and the second neural network based on the output error.

* * * * *